May 2, 1939.  H. A. S. READ, JR  2,156,434
METHOD AND APPARATUS FOR PACKING FRUIT
Filed Feb. 16, 1938  2 Sheets-Sheet 1

INVENTOR.
HARRY A. S. READ Jr.
BY Mueller Ruhl
ATTORNEYS

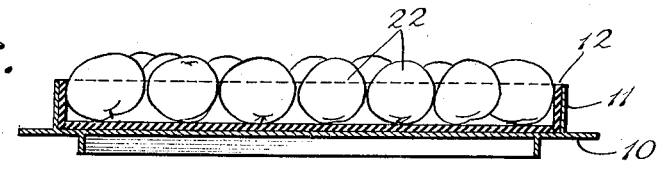
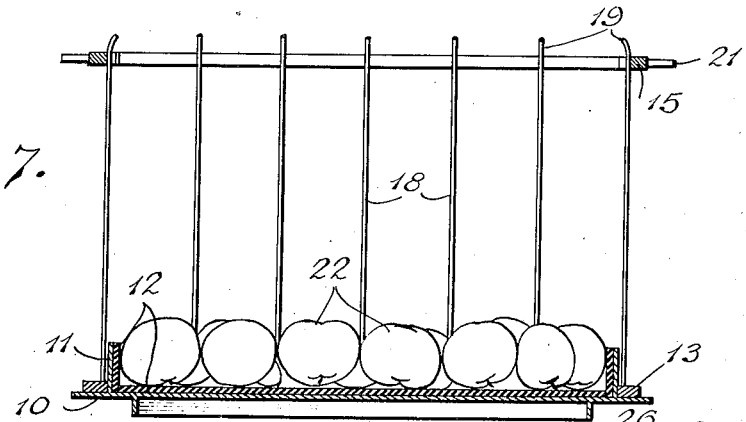
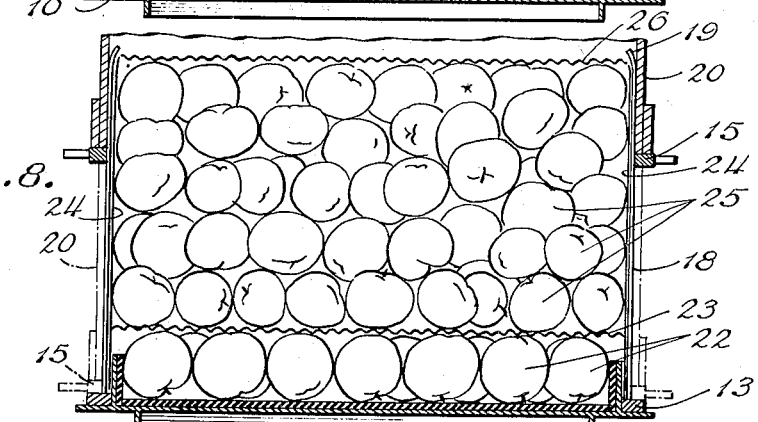
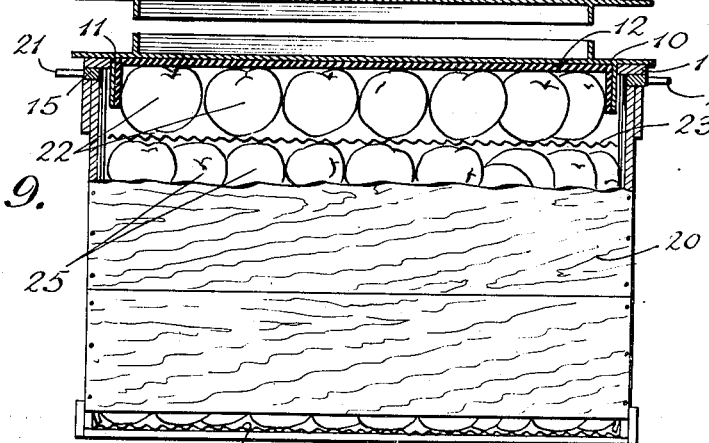

Patented May 2, 1939

2,156,434

UNITED STATES PATENT OFFICE 2,156,434

METHOD AND APPARATUS FOR PACKING FRUIT

Harry A. S. Read, Jr., Albion, N. Y.

Application February 16, 1938, Serial No. 190,758

6 Claims. (Cl. 226—17)

This invention relates to improvements in the art of packing fruit in containers and has particular reference to an apparatus for accomplishing such packing and the method of using the same.

An object of the invention is to provide an improved apparatus of simple and practical construction which will greatly facilitate the packing of a container with fruit and enable an even top surface layer of the fruit to be obtained so as to enhance the appearance of the package.

Another object is to utilize a cage for temporarily containing the fruit during the process of packing the same and to provide said cage with a movable frame which will reinforce the body of the cage against outward pressure of the fruit while said body is being filled, and upon which a container, wherein the fruit is ultimately packed, may be supported and guided to an enclosing position with respect to the cage body and fruit therein by a movement by said frame and container relative to said body.

The above and other objects will appear more clearly from the following detailed description when taken in connection with the accompanying drawings which illustrate a preferred embodiment of the inventive idea.

In the drawings:

Figure 6 is a sectional view through the facing plate illustrating the first step in the method of packing.

Figure 7 is a sectional view showing the cage in position on the facing plate preparatory to filling said cage with fruit.

Figure 8 is a fragmentary sectional view illustrating the cage filled with fruit and a container mounted in an inverted position upon the movable frame of said cage, with said container and frame partially lowered, the dotted lines indicating the position of the frame and container when the latter has been completely lowered to enclose the fruit therein, and, Figure 9 is a view partly in elevation and partly in section showing the container and packing apparatus inverted so that the former is in its upright position wherein the apparatus including the cage and the facing plate may be withdrawn and lifted from the container, thus completing the packing operation.

In its preferred form, the apparatus is shown as comprising, a facing plate 10 having walls 11 upstanding from the plate 10 adjacent the marginal edges thereof to define an enclosure for the facing layer of fruit. If desired, the bottom of said enclosure and the interior of the walls 11, may be lined with rubber matting 12 to afford a cushion for the fruit to prevent injury thereto while being packed.

Figure 1:
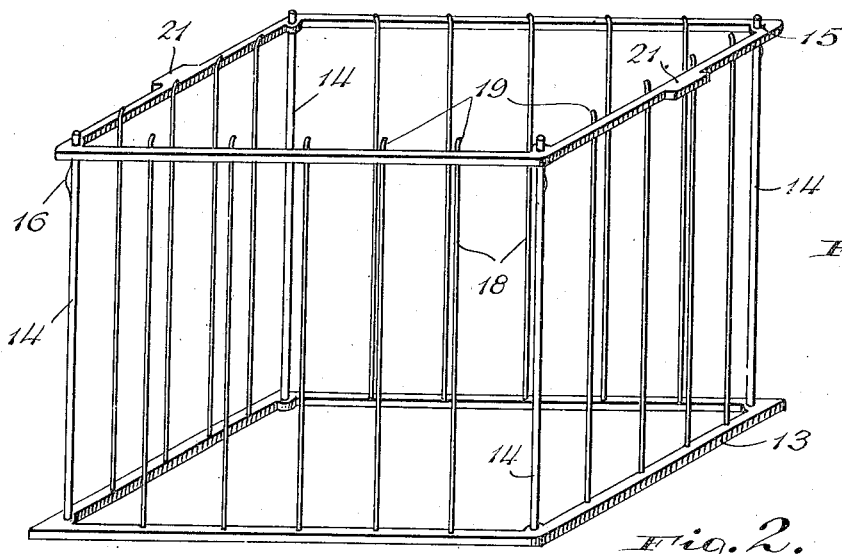
Figure 1 is a perspective view of a cage utilized in packing fruit within a container.
Figures 2, 4:
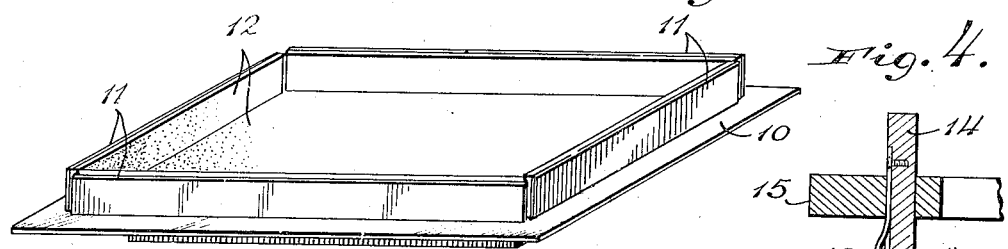
Figure 2 is a similar view of a facing plate employed in conjunction with said cage.
Figure 4 is an enlarged fragmentary detail of one of the standards constituting the packing cage, and showing a means for retaining the movable frame of said cage in its raised position, as shown in Fig. 1.
Figure 3:
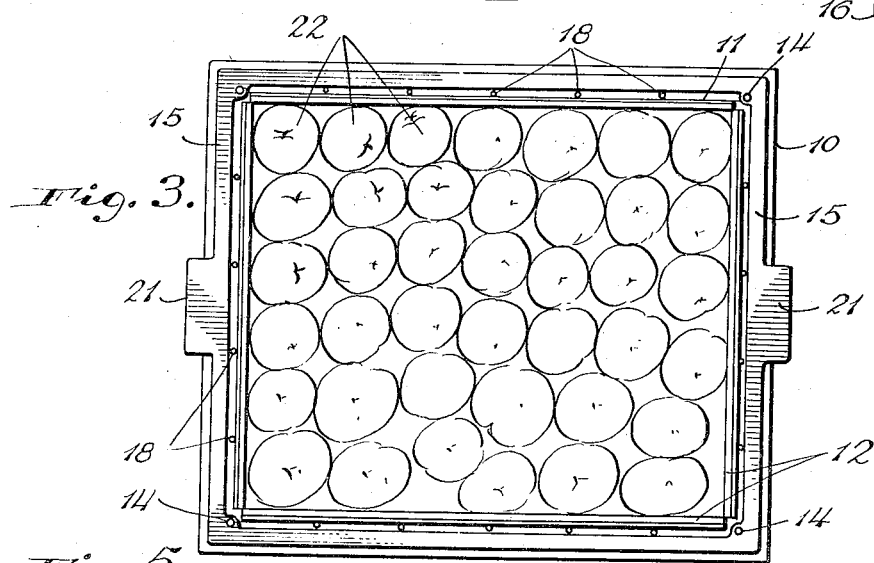
Figure 3 is a top plan view illustrating the cage in position on the facing plate during the process of packing the fruit.

The packing cage which embodies certain of the novel features of the invention, comprises a base frame 13 of the same configuration of the enclosure formed by the walls 11 and of sufficient size to fit over the exterior of said walls so that the frame may be supported upon the marginal portion of the plate 10. Extending upwardly from the base frame 13, preferably at the corners thereof when said frame is made rectangular, are a plurality of standards 14 adapted to extend through and guide a vertically movable container-supporting frame 15 capable of bodily movements in linear directions relative to the base frame 13 so that said frame 15 may be raised and lowered during the operation of packing the fruit. Means are provided for releasably maintaining the frame 15 in its raised position, as shown in Fig. 1, during the process of filling the cage with fruit. Said means preferably takes the form of small bowed leaf springs 16 secured in the standards 14 adjacent the upper end thereof and positioned therein so that when the same are in their normal bowed condition they will engage the underside of the frame 15 and thus constitute latches for supporting the latter in its raised position. When the frame 15 is forced downwardly the springs will be recessed within the grooves 17 in the standards to permit the frame to pass said springs after which the latter will return to normal position.

The cage further comprises a plurality of horizontally spaced rods 18 the lower ends of which are affixed in the frame 13 while the upper ends are free. Said rods extend through the frame 15 and contact the inner edge thereof so as to be braced by said frame against the outward pressure of fruit poured into the cage during the packing process, and the upper extremities of said rods are inturned as indicated at 19 so that they will not interfere with the proper placing of a container 20 (Figs. 8 and 9) in an inverted position upon said frame 15 preparatory to enclosing the fruit within said container. To prevent accidental detachment of the frame 15 from the standards 14 after being positioned thereon, the upper extremities of said standards may be headed, if desired. At oppositely disposed points, the frame 15 may be provided with enlargements 21 forming grips by which the frame may be adjusted relative to the standards and base frame 13.

Figure 5:
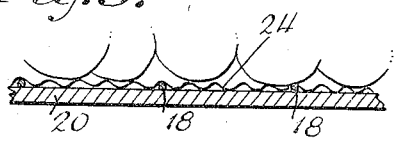
Figure 5 is a fragmentary horizontal section illustrating the manner of disposing corrugated liners within the cage so that grooves of said corrugations will receive the vertically disposed spaced rods forming a part of the body of said cage.

The various steps in the method of packing fruit within a container 20 will now be described. As shown in Fig. 6, the facing plate 10 first has placed therein a layer of fruit 22 which ultimately constitutes the top layer of the container 20 when the latter is fully packed. The cage is then mounted in position upon the marginal portion of the plate 10 so that the base frame 13 of said cage encircles the walls 11. With the movable frame 15 in its raised position, a liner of corrugated paper 23 (Fig. 8) is laid upon the fruit 22 and other liners 24 (Fig. 5) are extended about the interior of the walls of the cage formed by the vertical rods 18. These liners are positioned in the cage with their corrugations running vertically so that said rods 18 will engage in grooves of the liner 24. By so disposing the liner with respect to the rods, instead of having the corrugations extending transversely to said rods, the pressure of the fruit within the cage will not have a tendency to cause the rods to partially embed themselves transversely in the corrugations and thus, when the cage is withdrawn from the container 20 in the final step of the packing operation, the friction between said rod and the liner 24 will be considerably reduced, thereby rendering it easier to withdraw the cage; also, there will be less likelihood of accidental displacement of said liner during the withdrawal of said cage.

After the liner 23 has been placed in position the cage is filled by pouring fruit 25 thereinto and another liner 26 is then laid upon the fruit. The container 20 is now placed in an inverted position upon the frame 15, as shown in Fig. 8, and downward pressure is exerted upon said container and the frame 15 so as to force the same toward the base frame 13. When the parts have assumed the dotted line position shown in Fig. 8 said container will completely enclose the body of the cage and its contents, whereupon the container and facing plate are inverted to the upright position of the container shown in Fig. 9. The facing plate is now lifted from its position on the base frame 13 after which the handles 21 of the frame may be gripped and the entire cage withdrawn from within the container, thus completing the packing operation with the exception of applying a lid to the container.

What is claimed is:

1. Apparatus for packing fruit comprising a cage adapted to be mounted upon a facing plate, said cage comprising a body, including a base frame engageable with said plate, standards carried by said base frame, a vertically movable container-supporting frame guided by said standards, and a plurality of fruit-supporting elements extending between said frames.

2. Apparatus for packing fruit comprising a cage adapted to be mounted upon a facing plate, said cage comprising a body, including a base frame engageable with said plate, standards carried by said base frame, a vertically movable container-supporting frame guided by said standards, and a plurality of horizontally spaced rods extending from said base frame and braced by said supporting frame against outward lateral pressure by the fruit in said body.

3. Apparatus for packing fruit comprising a cage adapted to be mounted upon a facing plate, said cage comprising a body, including a base frame engageable with said plate, standards carried by said base frame, a vertically movable container-supporting frame guided by said standards, and a plurality of horizontally spaced rods extending from said base frame and braced by said supporting frame against outward lateral pressure by the fruit in said body, said rods being unattached to said supporting frame and having their upper extremities bent inwardly therefrom.

4. Apparatus for packing fruit comprising, in combination, a facing plate having a marginal supporting surface, a cage having a base frame removably mounted on said surface, standards extending from said frame, a container-supporting frame slidable on said standards toward and away from said base frame, and a plurality of spaced rods fixed at their lower ends to said base frame and having their upper ends freely contacting the inner surface of said supporting frame.

5. Apparatus for packing fruit comprising a cage adapted to be mounted upon a facing plate, said cage comprising a body, a container-supporting frame mounted on said body and movable relative thereto from a raised to a lowered position to enclose the contents of said body within the container supported by said frame, and means to releasably maintain said frame in its raised position.

6. Apparatus for packing fruit comprising a cage adapted to be mounted upon a facing plate, said cage comprising a body, including a base frame engageable with said plate, standards carried by said base frame, a vertically movable container-supporting frame guided by said standards, and latching means carried by said standards and engageable with said frame, when the latter is raised, to yieldably support the same in such position.

HARRY A. S. READ, Jr.